United States Patent [19]

Valyocsik

[11] Patent Number: 4,531,012

[45] Date of Patent: Jul. 23, 1985

[54] ORGANIC TEMPLATE FOR SYNTHESIS OF ZSM-23 ZEOLITE

[75] Inventor: Ernest W. Valyocsik, Yardley, Pa.

[73] Assignee: Mobil Oil Corporation, New York, N.Y.

[21] Appl. No.: 490,084

[22] Filed: Apr. 29, 1983

[51] Int. Cl.$^3$ ............................................. C07C 87/30
[52] U.S. Cl. ..................................... 564/295; 502/77; 423/328; 423/329
[58] Field of Search ................................ 564/295, 294

[56] References Cited

U.S. PATENT DOCUMENTS

| | | | |
|---|---|---|---|
| 1,005,217 | 10/1911 | Hofmann et al. | 564/295 |
| 2,256,959 | 9/1941 | Muskat | 564/295 |
| 2,375,853 | 5/1945 | Kirby et al. | 564/295 |
| 3,140,249 | 7/1964 | Plank et al. | 208/120 |
| 3,140,251 | 7/1964 | Plank et al. | 224/101 |
| 3,140,253 | 7/1964 | Plank et al. | 224/101 |
| 3,349,032 | 10/1967 | Krieg | 564/295 |
| 3,371,116 | 2/1968 | Nordgren et al. | 564/295 |
| 3,499,903 | 3/1970 | Minisci et al. | 564/295 |

OTHER PUBLICATIONS

Barlow et al., Nature, vol. 161, p. 718, (1948).
Barlow et al., J. Pharm. & Pharmacol, (1953), pp. 35–38.

*Primary Examiner*—James H. Reamer
*Attorney, Agent, or Firm*—A. J. McKillop; M. G. Gilman; L. P. Hobbes

[57] ABSTRACT

There is disclosed an organic cation R+, designated Diquat-7, having the formula:

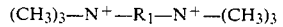

wherein $R_1$ is a saturated or unsaturated straight chain hydrocarbon group containing seven carbon atoms. There is also disclosed a method of preparing Diquat-7, and salts and hydroxide thereof.

5 Claims, No Drawings

ORGANIC TEMPLATE FOR SYNTHESIS OF ZSM-23 ZEOLITE

BACKGROUND OF THE INVENTION

1. Field of the Invention

This invention relates to an organic template, and to a synthesis thereof, used in a method of preparation of ZSM-23 crystalline zeolite.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates, having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as having a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed by the relationship of aluminum to the cations, wherein the ratio of aluminum to the number of various cations, such as Ca/2, Sr/2, Na, K, Cs or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. The aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-23 (U.S. Pat. No. 4,076,842), ZSM-35 (U.S. Pat. No. 4,016,245), and ZSM-38 (U.S. Pat. No. 4,046,859).

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5, up to infinity. U.S. Pat. No. 3,941,871, now U.S. Pat. No. Re. 29,948, the entire contents of which are incorporated herein by reference, discloses a porous crystalline silicate zeolite made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294, the entire contents of all three patents being incorporated herein by reference, describe crystalline silicates or organosilicates of varying alumina and metal content.

Zeolite ZSM-23 has been previously synthesized in the presence of a nitrogen-containing organic cation or template such as pyrrolidine, as disclosed in U.S. Pat. No. 4,076,842, the entire contents of which are incorporated herein by reference. However, the synthesis with the previously known organic templates was conducted at a relatively limited silica ($SiO_2$) to alumina ($Al_2O_3$) mole ratios of 40-250.

SUMMARY OF THE INVENTION

A nitrogen-containing organic cation $R^+$ can be used as a novel organic template in the synthesis of the ZSM-23 zeolite at a relatively broad silica to alumina mole ratio of 40 to 5000. The organic cation, designated Diquat-7, has the following formula:

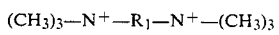

$$(CH_3)_3-N^+-R_1-N^+-(CH_3)_3$$

wherein $R_1$ is a saturated or unsaturated straight chain hydrocarbon group containing seven carbon atoms.

DETAILED DESCRIPTION OF THE INVENTION

The organic cation $R^+$, also designated herein as Diquat-7, is derived from the Diquat-7 hydroxide or organic or inorganic salt of Diquat-7. The salts of Diquat-7 are obtained by reacting a suitable precursor salt containing the functional group $R_1$, e.g., a heptyl derivative, containing two anions at the terminal carbon atoms, such as 1,7-dibromoheptane, with a stoichiometrically required amount of trimethylamine to form a diquaternary salt of the organic cation. The synthesis of the salt of Diquat-7 can be carried out with any organic or inorganic precursor salt containing the functional group $R_1$. The $R_1$ group of the organic cation may be heptyl or it may have one or more double or triple unsaturated bonds. Thus, for example, $R_1$ may have one double unsaturated bond, or two or three consecutive or non-consecutive double unsaturated bonds, e.g.,
—CH=CH—CH$_2$—CH$_2$—CH$_2$—CH$_2$—CH$_2$—,
—CH$_2$—CH=CH—CH$_2$—CH$_2$—CH$_2$—CH$_2$—,
—CH$_2$—CH$_2$—CH=CH—CH$_2$—CH$_2$—CH$_2$—,
—CH=CH—CH=CH—CH$_2$—CH$_2$—CH$_2$—,
—CH=CH—CH$_2$—CH$_2$—CH$_2$—CH=CH—,
—CH=CH—CH$_2$—CH=CH—CH=CH—, —CH$_2$—CH=CH—CH=CH—CH=CH—,
—CH=C=C=CH—CH$_2$—CH$_2$—CH$_2$—, —CH$_2$—CH=CH—CH—CH=C=CH—. Alternatively, the $R_1$ group may contain at least one triple unsaturated bond, e.g., —C≡C—CH$_2$—CH$_2$—CH$_2$—CH$_2$—CH$_2$—, —CH$_2$—CH$_2$—C≡C—CH$_2$—CH$_2$—CH$_2$— or —CH$_2$—CH$_2$—CH$_2$—CH$_2$≡C—CH$_2$—. However, in the most preferred embodiment, the $R_1$ group is heptyl.

The precursor salt contains two anions at the terminal carbon atoms of the functional group $R_1$. Thus, the precursor salt has the formula A—$R_1$—A, wherein $R_1$ is as defined above and A is an organic or inorganic anion.

Suitable inorganic anions are phosphate, halogens, e.g., fluoride, chloride, bromide, or iodide, sulfate, bisulfate, bisulfite, carbonate, bicarbonate, hexafluorophosphate, nitrate, oxyhalogen, such as chlorate, $ClO_3^-$, or perchlorate, $ClO_4^-$. Representative suitable organic anions are carboxylate, $R-COO^-$, amide, $RCONH_2R$, alkoxide, $R_3CO^-$, or etherate, $RO^-$.

Thus, in summary, the salt of Diquat-7 is synthesized in accordance with the following equation:

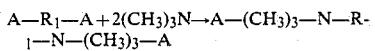

wherein $R_1$ and A are the same as defined above.

The synthesis of the Diquat-7 salt is conducted with a continuous stirring at a temperature of about 50° C. to about 80° C., preferably about 60° C. to about 80° C., at autogenous pressure in a suitable non-aqueous solvent, such as alcohol, e.g., ethanol, toluene or tetrahydrofuran until crystals of the Diquat-7 salt are formed, usually for about 4 to about 24 hours. The crystals of the product settle to the bottom, the reaction mixture is cooled, e.g., in a water-ice bath, and the product is separated from the reaction mixture by any suitable means, e.g., by filtration. The crystals are then washed with a suitable solvent, e.g., absolute ethanol, followed by a wash with an anhydrous diethyl ether. The Diquat-7 salt crystals are then dried and used in the ZSM-23 synthesis.

The hydroxide form of Diquat-7 may be obtained in any conventional manner from the salt of Diquat-7, such as by ion exchanging the salt of Diquat-7 with a suitable hydroxide in any conventional manner, e.g., in an ion-exchange column. Any of the conventional ion-exchange techniques may be used to replace the original anions with the hydroxide anion, as will be obvious to those skilled in the art. Representative of such ion exchange techniques are those disclosed in a wide variety of patents, e.g., U.S. Pat. Nos. 3,140,249, 3,140,251 and 3,140,253.

The Diquat-7 organic template, is used in synthesizing the ZSM-23 crystalline aluminosilicate in the manner set forth in detail in my copending U.S. patent application Ser. No. 490,084, filed Apr. 29, 1983. The charged cation $R^+$ is obtained when a salt or a hydroxide of Diquat-7 is dissociated in an aqueous reaction solution used to synthesize the ZSM-23 zeolite.

The synthetic ZSM-23 zeolite possesses a definite distinguishing crystalline structure whose X-ray diffraction pattern shows substantially the significant lines set forth in Table I.

TABLE I

| d(Å) | $I/I_o$ |
|---|---|
| 11.2 ± 0.23 | Medium |
| 10.1 ± 0.20 | Weak |
| 7.87 ± 0.15 | Weak |
| 5.59 ± 0.10 | Weak |
| 5.44 ± 0.10 | Weak |
| 4.90 ± 0.10 | Weak |
| 4.53 ± 0.10 | Strong |
| 3.90 ± 0.08 | Very Strong |
| 3.72 ± 0.08 | Very Strong |
| 3.62 ± 0.07 | Very Strong |
| 3.54 ± 0.07 | Medium |
| 3.44 ± 0.07 | Strong |
| 3.36 ± 0.07 | Weak |
| 3.16 ± 0.07 | Weak |
| 3.05 ± 0.06 | Weak |
| 2.99 ± 0.06 | Weak |
| 2.85 ± 0.06 | Weak |

TABLE I-continued

| d(Å) | $I/I_o$ |
|---|---|
| 2.54 ± 0.05 | Medium |
| 2.47 ± 0.05 | Weak |
| 2.40 ± 0.05 | Weak |
| 2.34 ± 0.05 | Weak |

The above values were determined by standard techniques. The radiation was the K-alpha doublet of copper, and a scinitillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d(obs.), the interplanar spacing in Angstrom units, corresponding to the recorded lines, were calculated. It should be understood that this X-ray diffraction pattern is characteristic of all the species of ZSM-23 compositions. Ion exchange of the sodium ion with cations reveals substantially the same pattern with some minor shifts in interplanar spacing and variation in relative intensity. Other minor variations can occur depending on the silicon to aluminum ratio of the particular sample, and on whether it has previously been subjected to thermal treatment.

EXAMPLE A

The Diquat-7 dibromide salt used to crystallize zeolite ZSM-23 was prepared by reacting 1,7-dibromoheptane and trimethylamine in accordance with the following stoichiometric equation:

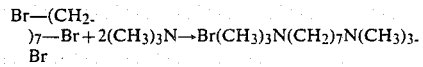

The procedure used was as follows:

150 grams (0.58 mole) of 1,7-dibromoheptane (available from Aldrich Chemical Company) was weighed out and transferred directly to a two-liter, three-necked reaction flask equipped with a stirrer. 300 ml absolute ethanol was added to the reaction flask while the contents of the flask were stirred continuously. Then, 300 grams (excess) of trimethylamine solution (25% in methanol, available for Eastman Kodak Chemical Company) was transferred directly to the two-liter reaction flask. The two-liter reaction flask was fitted with a dry-ice condensor to minimixe $(CH_3)_3N$ loss during reflux.

The reaction mixture was refluxed for about 14 hours. White crystals of Diquat-7 dibromide salt were formed and separated from the reaction solution at the end of the reflux period. The reaction flask was cooled by immersion in water-ice bath. The product was then filtered on a Büchner funnel. Product crystals were washed on the funnel several times with absolute ethanol, then several times with anhydrous diethyl ether. The Diquat-7 dibromine product crystals were dried by air stream on the Büchner funnel after the ether wash.

EXAMPLE 1

50.0 grams (g) of Q-brand sodium silicate (comprising 28.5% by weight (wt.) of $SiO_2$, 8.8% by wt. of $Na_2O$ and 62.7% by wt. of $H_2O$, was added to 50.0 grams of distilled water with stirring until the solution was clear, colorless, and uniform. A second solution was produced by adding 2.4 grams of aluminum sulfate $[Al_2(SO_4)_3.16$-

H₂O] and 1.8 grams H₂SO₄ (96%) to 83.9 grams of distilled water. This second solution was stirred until complete dissolution, whereupon 13.1 grams of the Diquat-7 salt produced in Example A was added to the solution. This second solution and the first solution, containing Q-brand sodium silicate, were then transferred directly to a 300 ml capacity stainless-steel autoclave with vigorous mixing at room temperature and autogeneous pressure. After a uniform hydrogel was produced, the autoclave was sealed and heating begun.

The molar ratios of the ingredients in the reaction mixture were:

$SiO_2/Al_2O_3 = 60$
$H_2O/SiO_2 = 40$
$OH^-/SiO_2 = 0.30$
$Na^+/SiO_2 = 0.59$
$R^+/SiO_2 = 0.15$

The mixture was continuously stirred and maintained at 160° C. for about 5 days, at which time crystallization was complete. The product crystals were filtered out of the solution. The product crystals were then transferred to a beaker containing distilled water and boiled with stirring for one hour, after which the product was refiltered and dried under a heat lamp in an air stream for 2 hours.

X-ray analysis of the product showed the crystals to have a diffraction pattern corresponding to that of Table I.

EXAMPLES 2-10

Crystallization of ZSM-23 was conducted in these examples under the same reaction conditions as in Example 1, and with the same reactants, except that silica sol (30% wt. of SiO₂, 70% H₂O) was used in some examples, as indicated, as the source of silica instead of the Q-brand sodium silicate, and sodium aluminate (NaAlO₂ was used in some examples, also as indicated, as the source of aluminum instead of Al₂(SO₄)₃.16H₂O. The reaction mixture composition, the length of the syntheses and the indentity of the product, as identified by the X-ray diffraction data, are set forth below in Table II.

TABLE II

| | Mixture Composition (Mole Ratios)[a] | | | | | |
|---|---|---|---|---|---|---|
| Example | $SiO_2$ $Al_2O_3$ | $OH^-$ $SiO_2$ | $Na+$ $SiO_2$ | Diquat-7[b] $SiO_2$ | Synthesis Time (hrs) | Product |
| 2 | 90 | 0.30 | 0.32 | 0.07 | 72 | 100% ZSM-23 |
| 3[d] | 90 | 0.30 | 0.32 | 0.07 | 72 | 100% ZSM-23 |
| 4 | 200 | 0.20 | 0.21 | 0.10 | 120 | 100% ZSM-23 |
| 5[d] | 200 | 0.20 | 0.21 | 0.10 | 120 | 100% ZSM-23 |
| 6 | 400 | 0.20 | 0.20 | 0.10 | 144 | 100% ZSM-23 |

TABLE II-continued

| | Mixture Composition (Mole Ratios)[a] | | | | | |
|---|---|---|---|---|---|---|
| Example | $SiO_2$ $Al_2O_3$ | $OH^-$ $SiO_2$ | $Na+$ $SiO_2$ | Diquat-7[b] $SiO_2$ | Synthesis Time (hrs) | Product |
| 7[d] | 400 | 0.20 | 0.20 | 0.10 | 84 | 100% ZSM-23 |
| 8[d] | 500 | 0.20 | 0.20 | 0.10 | 96 | 100% ZSM-23 |
| 9[d] | 700 | 0.20 | 0.20 | 0.10 | 168 | 100% ZSM-23 |
| 10[d] | 1000 | 0.20 | 0.20 | 0.10 | 120 | 100% ZSM-23 |

[a]H₂O/SiO₂ = 40 for all examples.
[b]Diquat-7 = 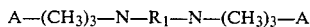: Bromide salt.
[c]Q-brand sodium silicate; Al₂(SO₄)₃.16 H₂O.
[d]Silica sol (30% SiO₂; 70% H₂O); NaAlO₂.

Analytical data for the as-synthesized ZSM-23 samples, in terms of mole ratios, of some examples is set forth in Table III.

TABLE III

| | C | Moles per mole Al₂O₃ | | |
|---|---|---|---|---|
| Example | N (mole ratios) | $N_2O$ | $Na_2O$ | $SiO_2$ |
| 1 | — | — | — | 41 |
| 2 | 6.5 | 1.6 | 0.83 | 56 |
| 3 | 6.5 | 1.6 | 0.83 | 56 |
| 4 | 6.1 | 4.7 | 0.78 | 173 |
| 5 | 6.1 | 4.7 | 0.78 | 173 |
| 7 | 6.9 | 6.3 | 2.6 | 274 |
| 9 | — | — | — | 420 |

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. A composition of matter comprising a compound of the formula:

wherein A is an organic or inorganic anion selected from the group consisting of phosphate, halogens, sulfate, bisulfate, bisulfite, carbonate, bicarbonate, hexafluorophosphate, nitrate, oxyhalogen, perchlorate, carboxylate, amide, alkoxide, and etherate and R₁ is an unsaturated straight chain hydrocarbon group.

2. A composition of matter of claim 1 wherein R₁ is a straight chain hydrocarbon group containing three double bonds.

3. A composition of matter of claim 1 wherein A is a halogen.

4. A composition of matter of claim 3 wherein A is bromide.

5. A composition of matter of claim 1 wherein R₁ is —CH=CH—CH₂—CH=CH—CH=CH—.

* * * * *